Sept. 19, 1967    A. VAN BREUGEL    3,343,159
RADAR PLAN-POSITION INDICATOR SYSTEMS
Filed Oct. 27, 1965    2 Sheets-Sheet 1

INVENTOR
ADRIANUS VAN BREUGEL
BY
AGENT 3,343,159
RADAR PLAN-POSITION INDICATOR SYSTEMS
Adrianus van Breugel, Hengelo, Overijssel, Netherlands, assignor to N.V. Hollandse Signaalapparaten, Hengelo, Overijssel, Netherlands, a firm of the Netherlands
Filed Oct. 27, 1965, Ser. No. 505,361
Claims priority, application Netherlands, Oct. 30, 1964, 64—12,631
5 Claims. (Cl. 343—5)

The invention relates to a radar plan-position indicator system comprising a cathode-ray tube which is provided with orthogonal deflection members, while with the use of a digital sine-cosine signal generator, a digital marker signal generator, four integrators and digital to analog convertors range and azimuth information as well as cartesian markers are displayed on the screen of the tube.

In a known system of this kind, the output signals of the digital sine-cosine signal generator are supplied during the receiving time and the output signals of the digital marker signal generator during the dead time to counting circuits which will act either as a digital integrator or as a holding register and which are each coupled through a digital to analog convertor with a deflection member of the cathode-ray tube.

In comparison with corresponding analog systems, this digital system has the advantage that no relative inaccuracies caused by drift phenomena can occur in the deflection of the electron beam. This known system has the disadvantage, however, that it cannot be used for short-range radar measurements, since the combination—digital integrator, digital to analog convertor—acts too slowly to be capable of supplying the steep sawtooth voltages then required.

The invention has for its object to provide a radar plan-position indicator system which, while retaining the said advantage, is also suitable for use in short-range radar measurements.

According to the invention, an indicator system of the kind described in the preamble is constructed so that four digital switches are provided through which either the output signals of the said digital sine-cosine signal generator or the output signals of the said digital marker signal generator can be supplied to the digital to analog convertors, that the output of each digital to analog convertor is connected through a direct connection to an associated pair of parallel-connected amplifiers one of which acts as an integrator by the interposition of a capacitor between its input and its output while the other acts as a linear amplifier by the interposition of a resistor between its input and its output; that the said capacitor and the said resistor are each shunted by a shortcircuiting switch and that the output of each of these parallel-combinations is coupled with a deflection member.

The invention and its advantages will now be described with reference to the figures, of which—

Figure 1:
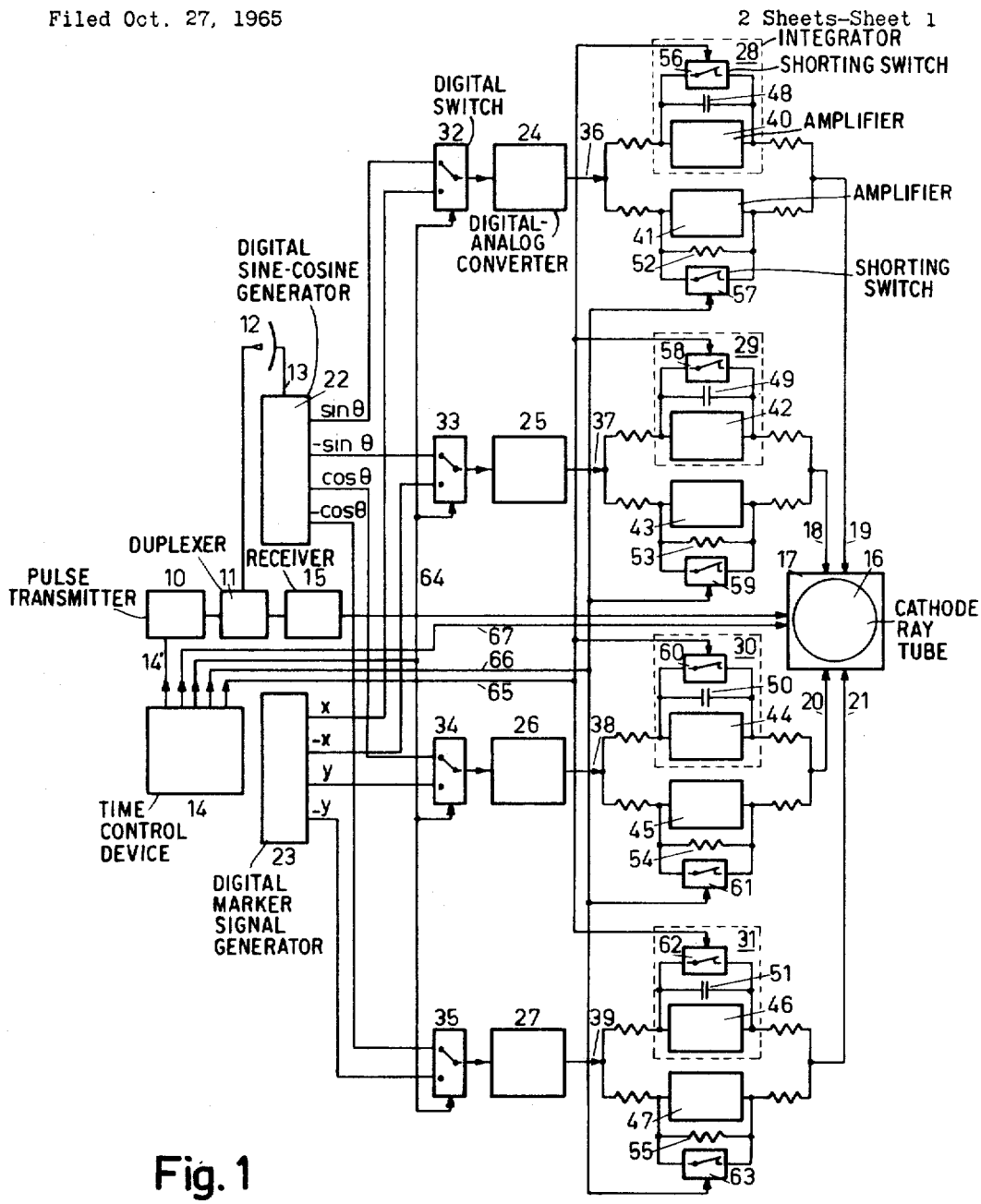
FIG. 1 shows diagrammatically a system in accordance with the invention.

Referring now to FIG. 1, reference numeral 10 denotes a pulse transmitter which supplies through a duplexer 11 electromagnetic high-frequency energy to a radar aerial 12 which is rotated continuously by an aerial driving shaft 13. Reference numeral 14 designates a time control device which inter alia, by means of synchronizing pulses supplied through lead 14' to the transmitter, determines the instant at which the transmitter pulses occur. The echoes picked up by the aerial 12 are supplied through the duplexer 11 to a receiver 15 the video output of which is connected to a cathode-ray tube 16 which forms part of an indicating device 17. The cathode-ray tube is provided with orthogonal deflection members (not shown) which are constituted, for example, by two pairs of deflection coils arranged on the cathode-ray tube in the usual manner. These deflection coils are connected pairwise to the respective outputs of two pushpull amplifiers which are incorporated in the indicating device 17 and to which deflection voltages are supplied through the conductors 18, 19 and 20, 21, respectively. With the use of a digital sine-cosine signal generator 22, a digital marker signal generator 23, four digital to analog convertors, 24, 25, 26, 27 and integrators 28, 29, 30 and 31, these deflection voltages are produced in order to display on the screen of the cathode-ray tube distance and azimuth information as well as markers.

As usual, the digital sine-cosine signal generator 22 is coupled to the aerial driving shaft 13 and this generator supplies output signals which are characteristic of the sine and cosine of the angular rotation $\theta$ of the aerial driving shaft or of a shaft coupled therewith. These output signals are preferably constituted by a binary number consisting of ten bits for each of the sine and cosine values and an additional bit for indicating the sign of the output signal.

The digital marker signal generator 23 is constituted, for example, by a computer which supplies in digital form output signals which are characteristic of X- and Y coordinate values of cartesian markers. These output signals are also constituted by a binary number consisting of ten bits for each of the X- and Y values and likewise an additional bit for indicating the sign of the output signal.

According to the invention, a particularly favourable and advantageous structure of the system described above is obtained by providing four digital switches 32, 33, 34 and 35 through which either the output signals of the digital sine-cosine signal generator 22 or the output signals of the digital marker signal generator 23 can be supplied to the digital to analog convertors 24–27; by connecting the output of each digital to analog convertor through a direct connection 36, 37, 38 and 39, respectively, to an associated pair of parallel-connected amplifiers 40, 41; 42, 43; 44, 45; and 46, 47; one of which acts as an integrator by the interposition of a capacitor 48 resp. 49, 50 and 51 between its input and its output, while the other acts as a linear amplifier by the interposition of an ohmic resistor 52 resp. 53, 54 and 55 between its input and its output; by shunting the said capacitor and the said resistor by shortcircuiting switches 56, 57 resp. 58, 59; 60, 61 and 62, 63 and by coupling the output of each of these parallel-combinations with a deflection member.

The four digital to analog convertors 24–27 are each constituted, for example, by a ladder network composed of equal resistors. Such digital to analog convertors are known per se; they are based on the principle of current addition along the ladder network, each partial current being expressed automatically in the final result with the power of ½ valid for the place at which the bit is received in the ladder network. The inversion of the current supply for the sign bit yields the correct relation between the polarity of the output current and the sign of the binary number supplied when the complementary binary code is used.

The digital switches 32–35 each consist of a plurality of diodes through which the digital to analog convertors are connected at choice to the sine-cosine outputs of the sine-cosine signal generator 22 or to the X/Y outputs of the marker signal generator 23. In view of the digital method, the quality of the information supplied does not deteriorate, drift problems do not occur and variations of the supply voltages cannot exert an undesirable influence.

The two amplifiers in each of the said parallel-combinations are preferably of the drift-free type and as far as possible they are of the same design and dimensions. When the respective shortcircuiting switches 56–63 are closed, the associated amplifiers are inoperative. The shortcircuiting switches are of the electronic type and are operated, just as the said digital switches, by means of switching signals of the time control device 14 which is provided with a program such that the shortcircuiting switches 56–63 are all closed in the quiescent state and that in the working state either the shortcircuiting switches associated with the amplifiers 40, 42, 44, 46 or the shortcircuiting switches associated with the amplifiers 41, 43, 45 and 47 are opened.

Since this new system uses analog integrators, the steep sawtooth voltages required for a short-range radar measurement can be produced without any difficulty. In this system, a relative shift between the radar information displayed on the screen of the cathode-ray tube and the markers displayed on this screen (drift) does not occur owing to the fact that the integrator provided for producing a sawtooth voltage and the amplifier provided for amplifying a marker deflection voltage are connected in parallel and that the use of electronic switches in the supply leads to this integrator and to this amplifier are avoided so that the deflection voltage received by the reproducing device is invariably equal to the sum of the voltages at the output of each of the two parallel-connected amplifiers.

Figure 2:
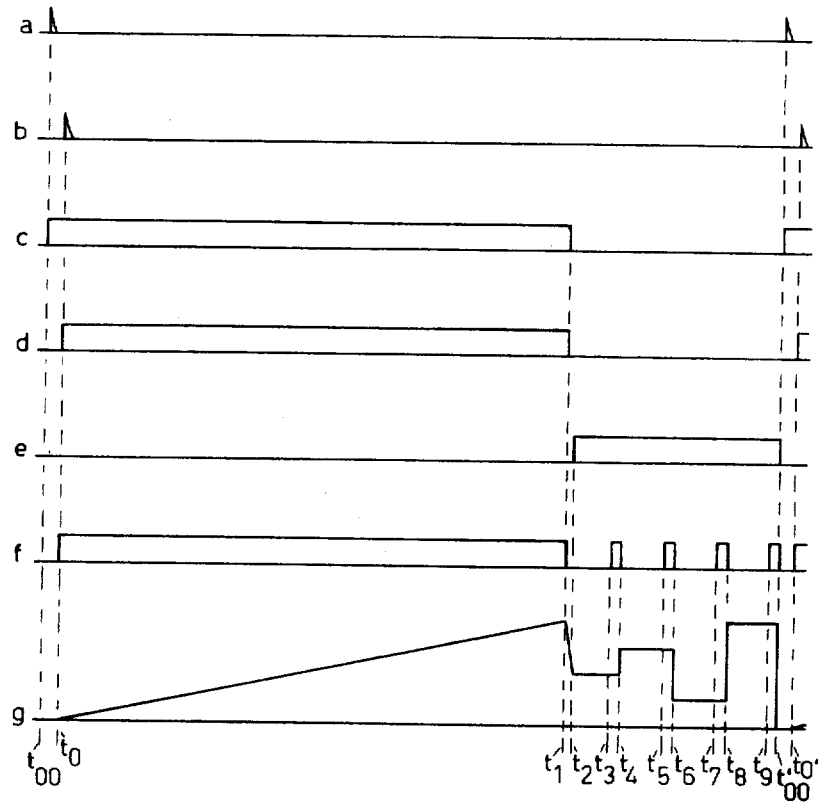
FIG. 2 shows a plurality of time diagrams for the illustration of the operation of the system shown in FIG. 1.

The operation of the system described can be explained as follows with reference to the time diagrams shown in FIGS. 2a–g:

At the instant $t_{00}$ in FIG. 2a, the time control device 14 supplies a pre-synchronizing pulse which gives rise inter alia to the generation of the switching signal shown in FIG. 2c which is supplied through lead 64 to the digital switches 32, 33, 34 and 35 which consequently connect the sine-cosine signal generator 22 to the digital to analog convertors 24–27 for the duration of this switching signal. The shortcircuiting switches 56–63 are then still in the quiescent state shown in which the respective amplifiers are inoperative. After a period of time sufficiently long for the digital to analog convertors 24–27 to convert the output signals of the sine-cosine signal generator 22, the time control device 14 supplies at the instant $t_0$ the normal synchronizing pulse which is shown in FIG. 2b. This synchronizing pulse causes the transmitting pulse and further gives rise inter alia to the production of the switching signal shown in FIG. 2d which is supplied through lead 65 to the shortcircuiting switches 56, 58, 60 and 62 which are consequently opened. The amplifiers 40, 42, 44 and 46 are then operative. Thus, the output currents of the digital to analog convertors 24–27 will be integrated in the integrators 28, 29, 30 and 31 constituted by these amplifiers, so that a sawtooth voltage is supplied to the indicator 17 through each of the conductors 18, 19, 20 and 21, which voltages together bring about a radial deflection of the electron beam produced in the cathode-ray tube 16 in a direction corresponding to the azimuth direction of the radar aerial 12.

The synchronizing pulse occurring at the instant $t_0$ gives also rise to the brightness control signal shown in FIG. 2f which is supplied through lead 67 to the indicator as a result of which the radial deflection of the electron beam becomes visible on the screen of the tube.

At the instant $t_1$, the switching signals shown in FIGS. 2c and 2d and the brightness control signal shown in FIG. 2f all disappear simultaneously. The digital switches 32–35 consequently establish the connection between the marker signal generator 23 and the digital to analog convertors 24–27, while the shortcircuiting switches 56, 58, 60 and 62 return to the quiescent state shown in which the amplifiers 40, 42, 44 and 46 are again inoperative.

After a period of time sufficiently long for the digital to analog convertors 24–27 to convert the digital values supplied by the marker signal generator 23, the time control device 14 supplies at the instant $t_2$ a switching signal shown in FIG. 2e which is supplied through lead 66 to the shortcircuiting switches 57, 59, 61 and 63 which are consequently opened. The amplifiers 41, 43, 45 and 47 are then operative. The said shortcircuiting switches 57, 59, 61 and 63 remain in the opened position till the instant $t'_{00}$. The time interval from $t_1$ to $t'_{00}$ is divided now, for example, into four equal intervals $t_1$–$t_4$, $t_4$–$t_6$, $t_6$–$t_8$, and $t_8$–$t'_{00}$. In each of these intervals, the marker signal generator 23 supplies in digital form X- and Y-co-ordinate values which determine the position of a marker to be written and which, after having been converted by the digital to analog convertors 24–27 into analog signals and after having been amplified in the respective amplifiers 41, 43, 45 and 47, are supplied through the conductors 18, 19, 20 and 21 to the indicator 17. The time control device 14 supplies through lead 67 a brightness control signal to the cathode-ray tube during the time intervals $t_3$–$t_4$; $t_5$–$t_6$; $t_7$–$t_8$; and $t_9$–$t'_{00}$, thus causing the screen to brighten up only after the electron beam has stopped in a marker position.

With regard to the operation set out hereinbefore, FIG. 2g illustrates the course of the voltage which is supplied, for example, through the conductor 19 to the indicator 17.

In the time interval $t_0$–$t_1$, this voltage is supplied by the integrator 28 and has a sawtooth-shape, thereafter it is supplied by the amplifier 41 during each of the intervals $t_1$–$t_4$; $t_4$–$t_6$; $t_6$–$t_8$ and $t_8$–$t'_{00}$ and has each time a different value corresponding with the X-co-ordinate value of a marker to be written in the relevant interval. From the instant $t'_{00}$, this cycle is repeated with other sinecosine and X/Y values. The time control device 14 may of course also be programmed differently, for example, so that markers are written exclusively after each tenth deflection. Finally, it may be noted, that the number of markers written in the dead time need not be limited to four. In fact, the maximum number of markers that can be written is limited by the quality of the pushpull deflection amplifiers in the indicator and of the deflection coils of the cathode ray tube.

What I claim is:

1. A radar plan-position indicating system of the type having an indicating device with orthogonal deflection means, a source of digital azimuth signals related to the azimuth of received signals, and a source of digital marker signals, wherein the improvement comprises digital to analog converting means, digital switch means for selectively applying said azimuth signals and marker signals to said converting means, parallel connected first and second amplifiers, means for applying the output of said converting means to the inputs of said first and second amplifiers, means applying the outputs of said first and second amplifiers to said deflection means, said first amplifier being an integrating amplifier having capacitor means connected between its input and output, said second amplifier being a linear amplifier having resistor means connected between its input and output, and means for selectively short circuiting said capacitor means and resistor means.

2. The indicating system of claim 1 in which said means for selectively short circuiting comprises means for short circuiting said resistor means when said azimuth signals are applied to said converting means, and for short circuiting said capacitor means when said marker signals are applied to said converting means.

3. The indicating system of claim 1 wherein said means for selectively short circuiting comprises normally closed switch means, and time control means for unshorting said capacitor means when said azimuth signals are applied to said converter means and for unshorting said resistor means when said marker signals are applied to said converter means.

4. A radar plan-position indicating system of the type having an indicating device with orthogonal deflection means, a source of four digital azimuth signals related to sine and cosine functions of the azimuth of received signals, and a source of four digital marker signals, wherein the improvement comprises four digital to analog converting means, a separate digital switch means for selectively applying a separate azimuth signal and a separate marker signal to each converting means, separate amplifier means for applying the output of each converting means to said deflection means, each amplifier means comprising parallel connected first and second amplifiers, each said first amplifier comprising an integrating amplifier having capacitor means connected between its input and output, and first switch means shunting said capacitor means, each second amplifier comprising a linear amplifier having resistor means connected between its input and output, and second switch means shunting said resistor means, and time control means connected to selectively operate said first and second switch means and each of said digital switch means, whereby all of said first switch means are simultaneously open, all of said second switch means are simultaneously open, said first switch means are closed when said second switch means are open, and said second switch means are closed when said first switch means are open.

5. The indicating system of claim 4 in which said first and second switch means are normally closed switches, and said time control means comprises means for opening said first switch means when said azimuth signals are applied to said converting means by way of said digital switch means, and means for opening said second switch means when said marker signals are applied to said converting means by way of said digital switch means.

References Cited
UNITED STATES PATENTS 3,134,974    5/1964    Orenstein.
3,159,830    12/1964    MacAulay.

RODNEY D. BENNETT, *Primary Examiner.*

CHESTER L. JUSTUS, *Examiner.*

D. C. KAUFMAN, *Assistant Examiner.*